March 8, 1955  C. A. MACOMIC  2,703,715
COMPOSING MACHINE
Filed Feb. 12, 1949  9 Sheets-Sheet 1

Inventor
Chester A. Macomic
by Parker & Carter
Attorneys

March 8, 1955

C. A. MACOMIC 2,703,715

COMPOSING MACHINE

Filed Feb. 12, 1949

Inventor
Chester A. Macomic
by Parker & Carter
Attorneys

March 8, 1955

C. A. MACOMIC 2,703,715

COMPOSING MACHINE

Filed Feb. 12, 1949

Inventor
Chester A. Macomic
by Parker & Carter
Attorneys

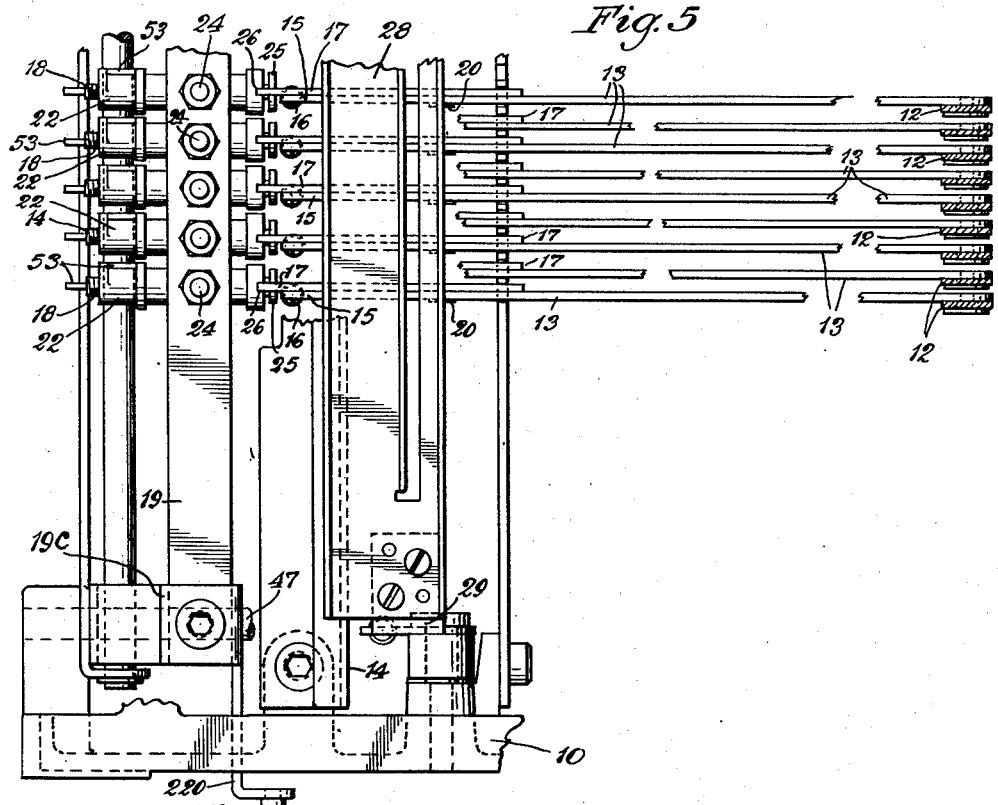
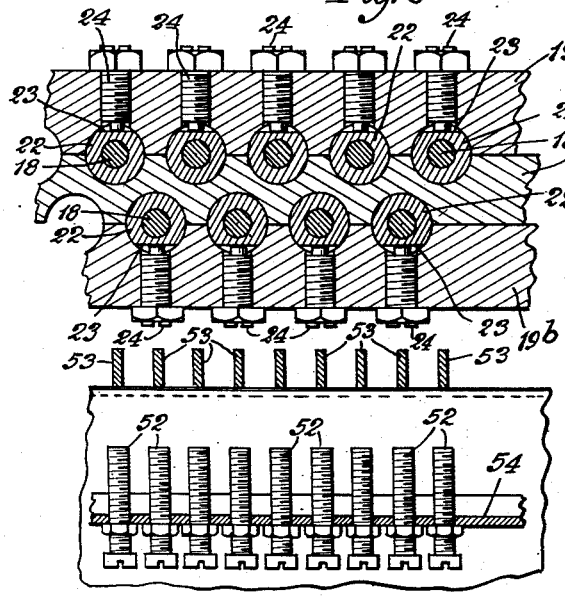

March 8, 1955
C. A. MACOMIC
2,703,715
COMPOSING MACHINE
Filed Feb. 12, 1949
9 Sheets-Sheet 6
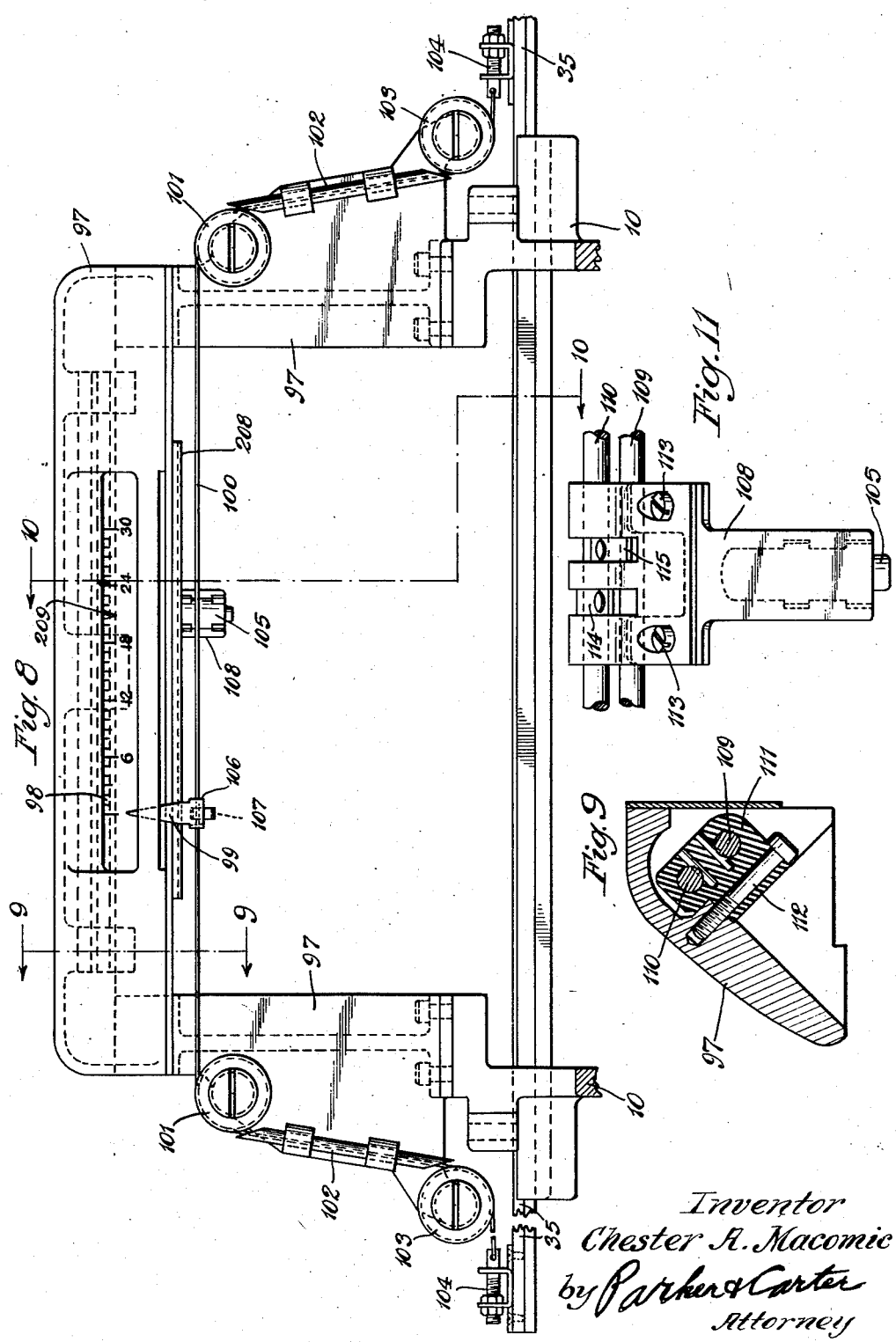
Inventor
Chester A. Macomic
by Parker & Carter
Attorney March 8, 1955 — C. A. MACOMIC — 2,703,715
COMPOSING MACHINE
Filed Feb. 12, 1949 — 9 Sheets-Sheet 7

Inventor
Chester A. Macomic
by Parker & Carter
Attorneys

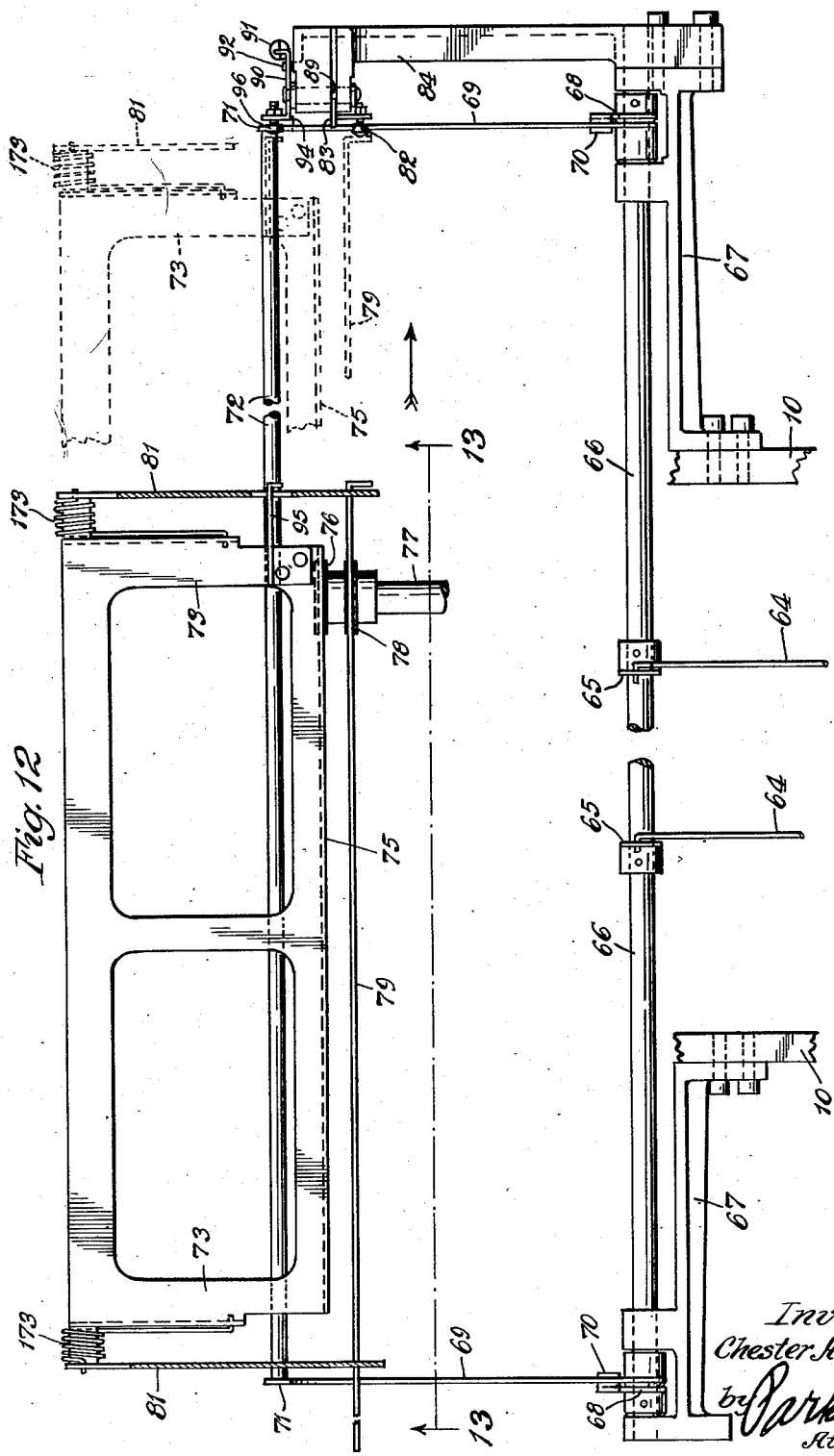

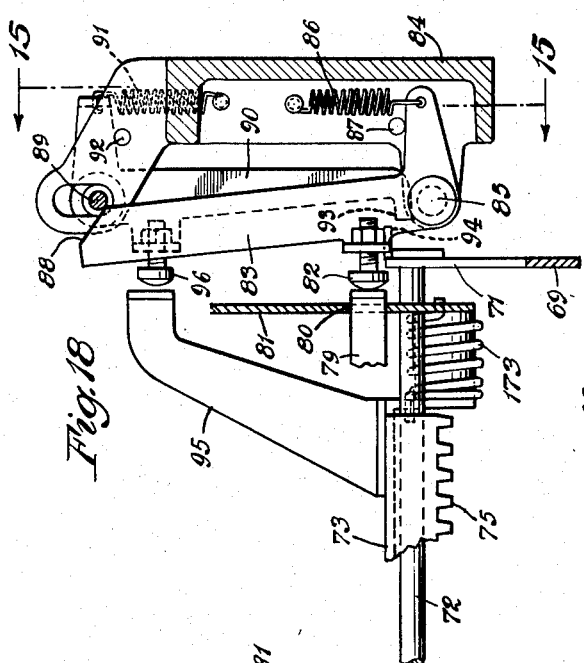
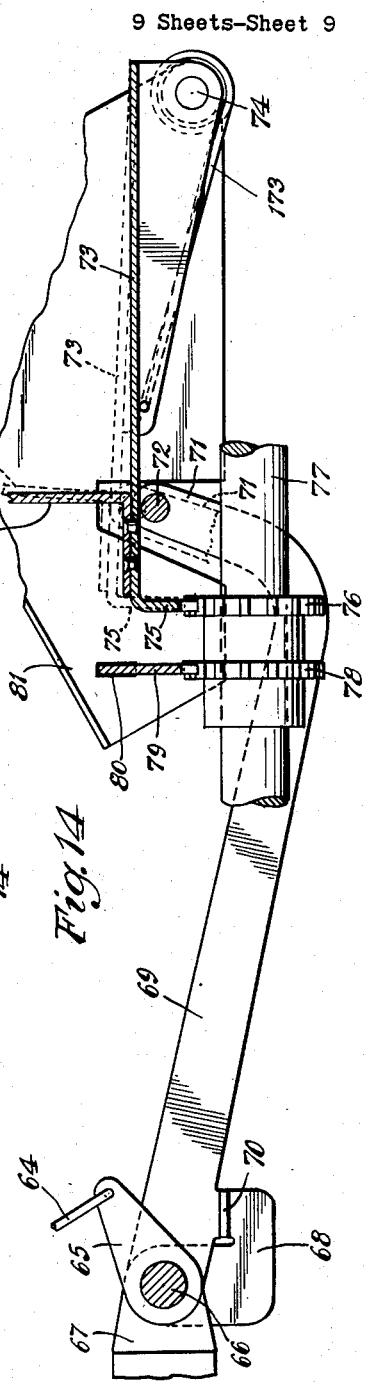
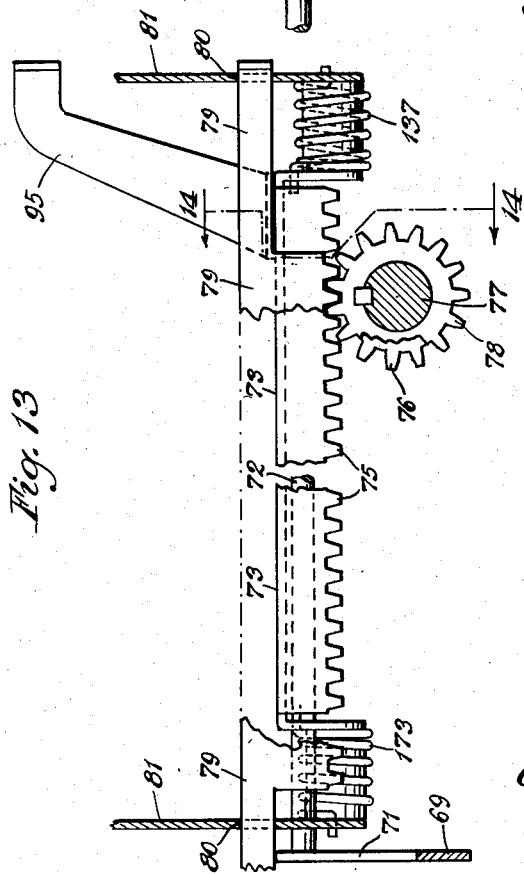

United States Patent Office 2,703,715
Patented Mar. 8, 1955

2,703,715

COMPOSING MACHINE

Chester A. Macomic, Chicago, Ill., assignor to Patent Development Corporation, Chicago, Ill., a corporation of Illinois Application February 12, 1949, Serial No. 76,136

18 Claims. (Cl. 276—8)

My invention relates to improvements in composing machines and has for one object to provide in a composing machine a mechanism which is adapted to the selection of characters for printing or other reproduction.

Another object of my invention is to provide micrometrically accurate means whereby, in coordination with a typewriter carriage, characters may be selected, aligned and justified for printing or other reproduction.

Another object of my invention is to provide in consonance with a typewriter carriage which moves a predetermined equal distance for each character, means whereby a plurality of characters of varying widths may be assembled, spaced and justified.

Another object of my invention is to provide, in cooperation with a typewriter carriage having uniform step-by-step movement for each character selected, means for selecting, spacing and justifying characters of varying widths whereby in the assembled line, the space occupied by each character is a function of character width rather than a function of typewriter carriage movement.

Other objects will appear from time to time in the course of the specification.

My invention, in general, contemplates the use of the standard conventional typewriter which includes typewriter keys, character bars actuated by the keys, a typewriter carriage having a platen adapted to carry paper or similar material which receives the imprint of the typewriter keys, together with an escapement which causes the typewriter carriage to move longitudinally step by step in response to the actuation of the type elements, the typewriter, of course, having the usual space bar escapement.

This typewriter is associated with a separate selector main frame upon which it is mounted. Contained within the selector main frame is a slide member which moves forwardly step by step in consonance with each character stroke of the typewriter, and which is held in position after each such movement until the entire line of characters has been assembled. This slide controls the movement of those parts of the composition machine which control the assembly of the proper number of properly spaced and adjusted characters in the line ultimately to be arranged for reproduction.

In view of the fact that typewriters have their carriages moving forward an equal amount no matter what the character selected, and in view of the fact that printing and the like, for which my apparatus makes up the composed matter, uses characters of different widths and those characters must be spaced and positioned in accordance with their widths, it is important that the movement of the slide be different with respect to each letter because of the different widths of the letters. Means are provided whereby the response of the slide to character key manipulation varies from character to character so that, for instance, if the character "m" is selected, I get the same movement on the typewriter carriage as if "i" were selected, but I get a totally different movement of the slide where "m" is selected from the movement when "i," the narrow letter, is selected.

With no exception, each letter, whether capital or lower case, occupies the same length in a line of a typewritten matter. But, with only a few exceptions, in conventional printers' type, the capital letters occupy more lineal space than do the lower case letters.

So I adjust the movement of the slide to take care not only of variation between widths of capitals or between widths of lower case letters, but also to take care of the difference in widths between capitals and lower case letters, and means are therefore provided in my device whereby when the shift key on the typewriter is manipulated to shift over from lower case to capitals, the response of the slide to selection of the typewriter key varies according to whether a capital or a lower case letter is to be selected.

The slide in my device moves along as the typewriter carriage moves but its distance of travel differs from line to line.

Lines of characters written by the typewriter have always the same number of characters in each linear unit of line length. Lines of characters assembled for printing or other reproduction may frequently have a different number of characters in the linear length, so when a line of characters is written on the typewriter there may be more or less characters, but such writing must be stopped when such a number of characters has been written as will fill the justified line of type of predetermined length of line.

The movement of the slide in response to the typewriter carriage may vary from line to line while the typewriter carriage movement remains uniform, and so means must be provided whereby the slide, no matter what its excursion may have been, will always return to the starting position at the same time and at the same point that the typewriter carriage returns to the starting position. So, the problem is one not only of varying and controlling the movement of the slide in coordination with typewriter carriage movement, but also the problem of releasing the slide and its associated parts in such wise that the slide and associated parts always return to the starting position.

The problem is further complicated by the fact that the selection of a spacer or justifier between words operates from the space bar on the typewriter to give the typewriter carriage the same forward movement it would have if a type had been selected. Nevertheless, the operating means for the movement of the selector carriage which moves in consonance with the typewriter carriage in the selection of a type must be halted or held stationary when the space bar is struck because the space bar must be used for spacing between words. This means that the typewriter carriage, in its longitudinal movement driving the selector carriage forward with it for type bar selection, will still continue to move when the selector carriage remains stationary and will therefore move a greater total distance than the driving means permits the selector carriage to move. It therefore becomes necessary in the return of these carriages to find a means for returning both carriages to zero—the typewriter carriage and the selector carriage.

In order that the operator may know at all times the progress being made in the assembly of the selected line of characters, a visual indicator is provided, associated with the typewriter, which moves forward step by step in consonance with the movement of the mechanism under control of the slide which will indicate the space occupied in the selected length of line by the conventional type printers' type so that the operator may know when the end of the line has been approached.

My invention is illustrated more or less diagrammatically in the accompanying drawings, wherein:

Figure 5 is a partial sectional view on an enlarged scale along the line 5—5 of Figure 4;

Figure 6 is a section on an enlarged scale along the line 6—6 of Figure 4;

Figure 7 is a section on an enlarged scale along the line 7—7 of Figure 4;

Figure 8 is a section on an enlarged scale along the line 8—8 of Figure 1, with typewriter omitted;

Figure 9 is a section on an enlarged scale along the line 9—9 of Figure 8;

Figure 11 is a rear elevation of the adjustable microswitch viewed in the direction of the arrows 11 of Figure 10;

Figure 12 is a front view in part section of the drive rack assembly between the typewriter carriage and the selector carriage, viewed in the direction of the arrows 12—12 of Figure 1;

Figure 13 is a section on an enlarged scale along the line 13—13 of Figure 12;

Figure 14 is a section along the line 14—14 of Figure 13;

Figure 18 is a section along the line of 18—18 of Figure 1.

Like parts are indicated by like numbers throughout the specification and drawings.

Figure 1:
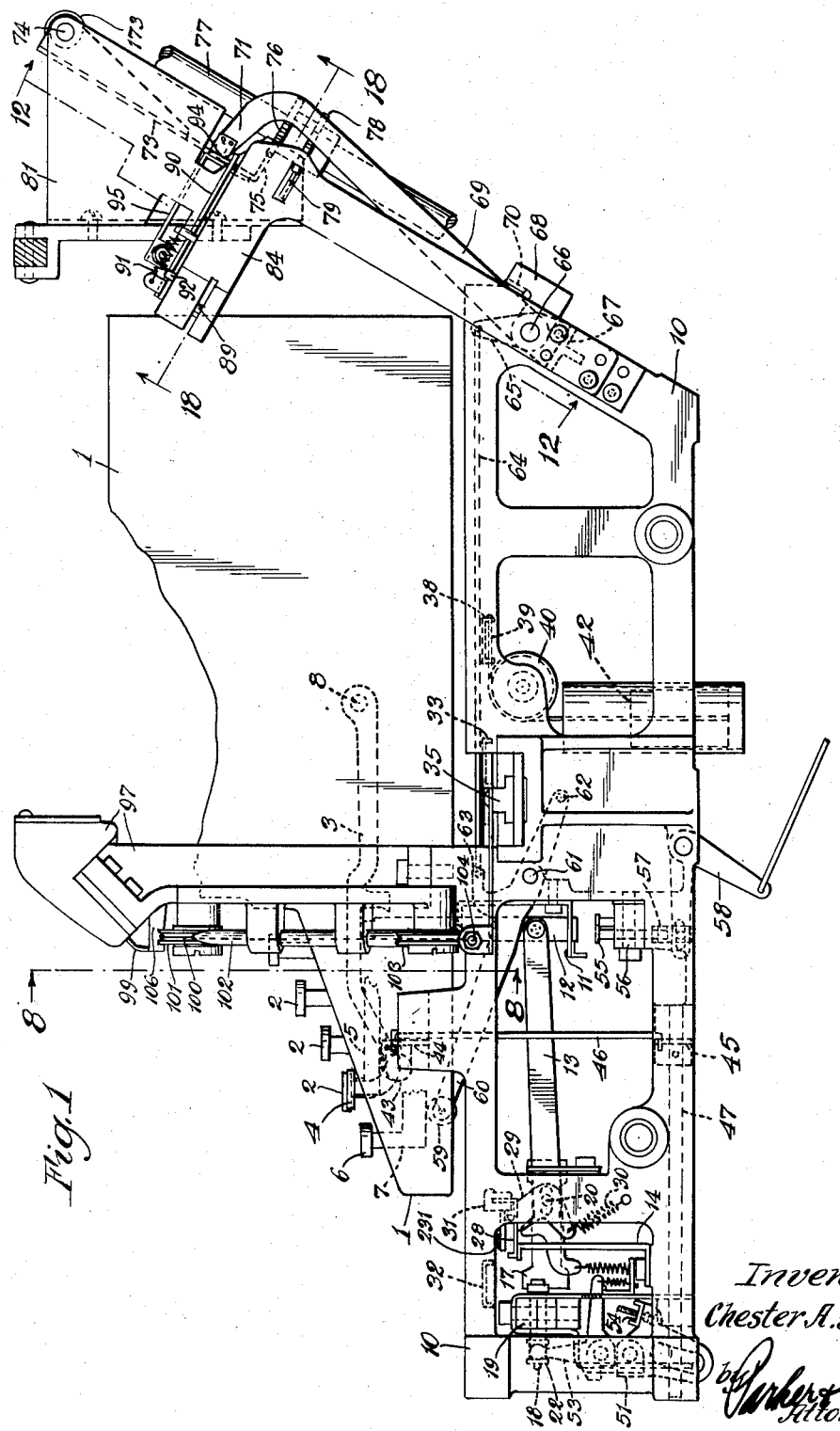
Figure 1 is a side elevation of a typewriter and selector unit frame with parts omitted.
Figure 2:
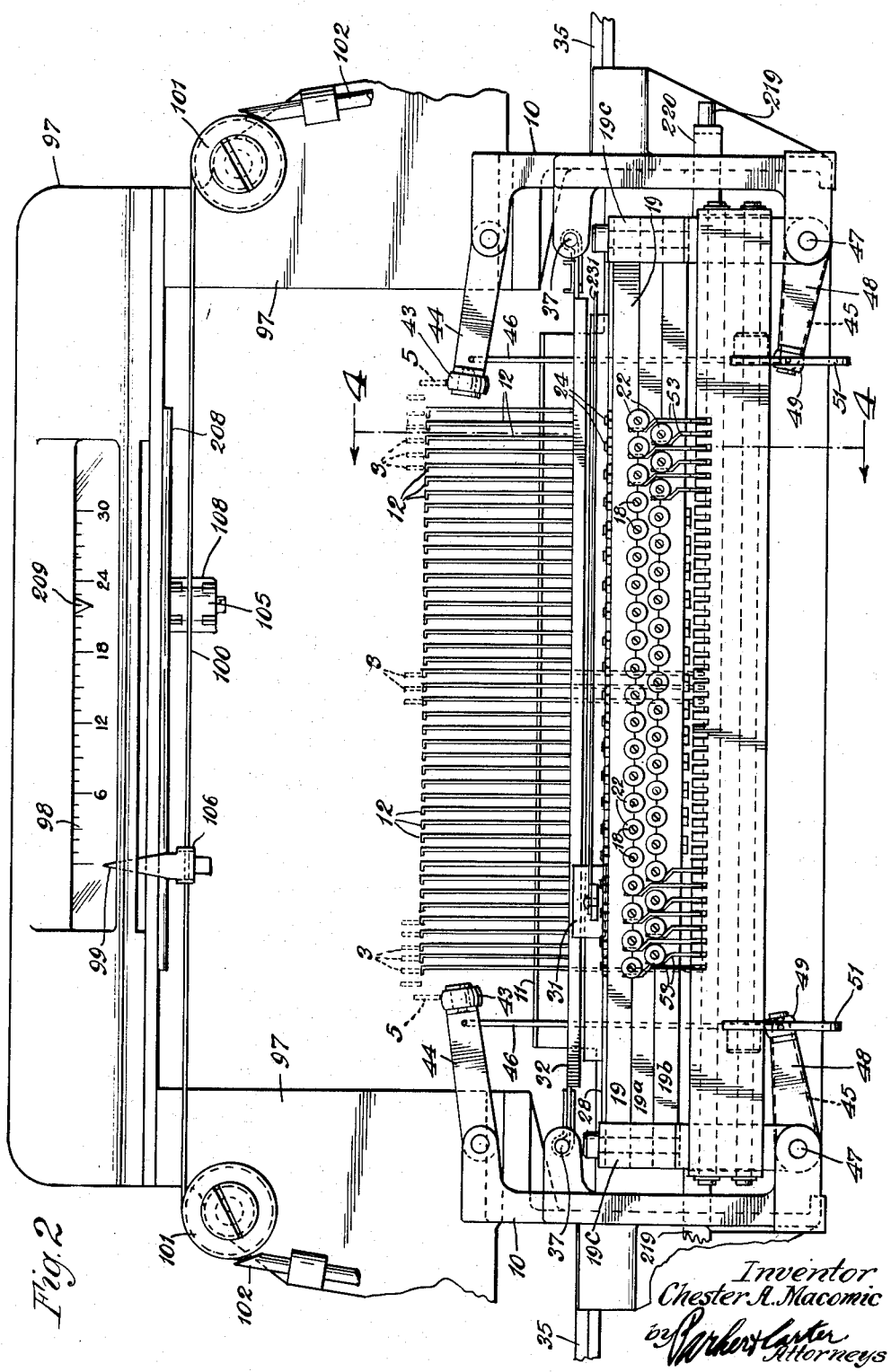
Figure 2 is a front view of Figure 1 with parts omitted.
Figure 4:
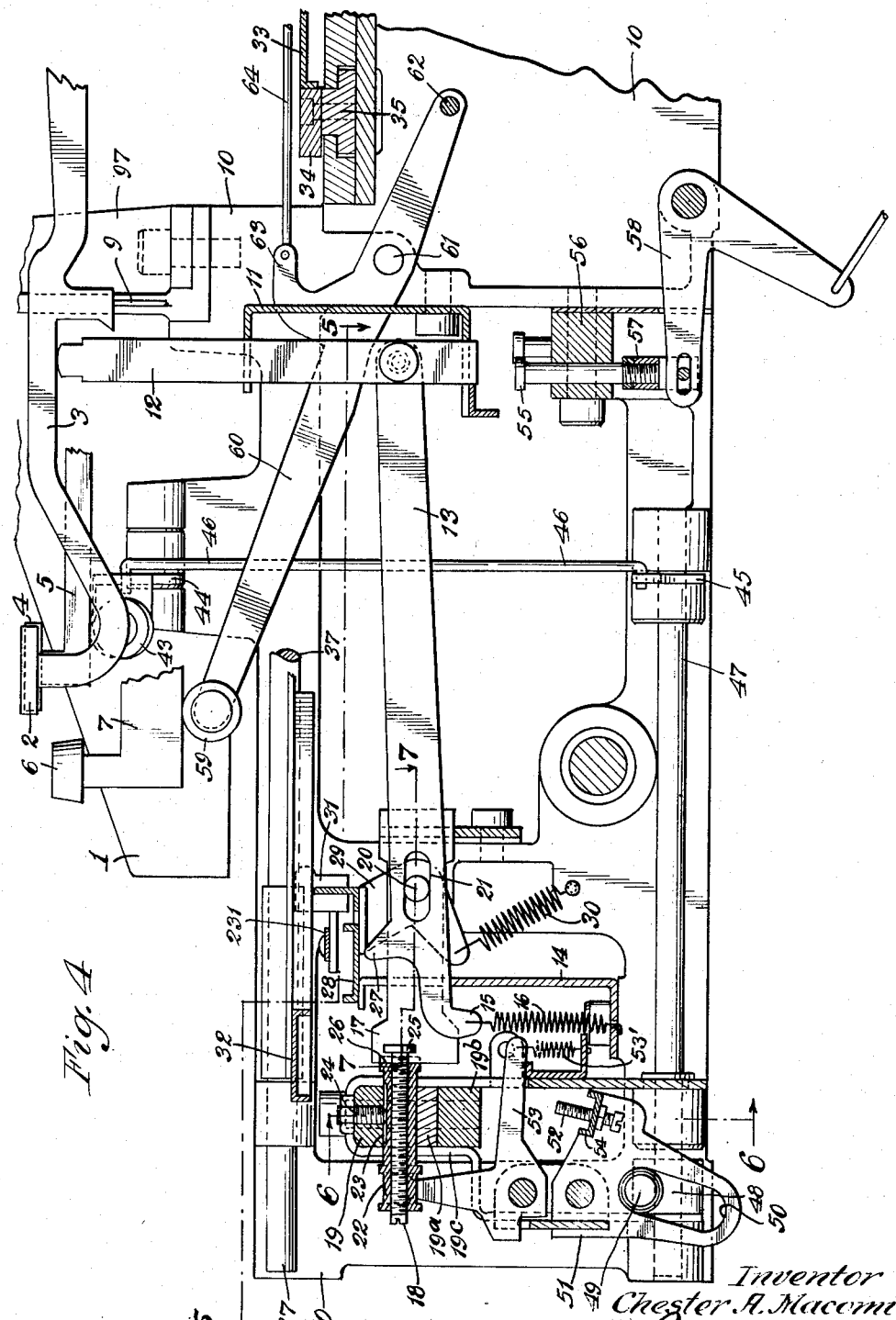
Figure 4 is a section on an enlarged scale along the line 4—4 of Figure 2.
Figure 10:
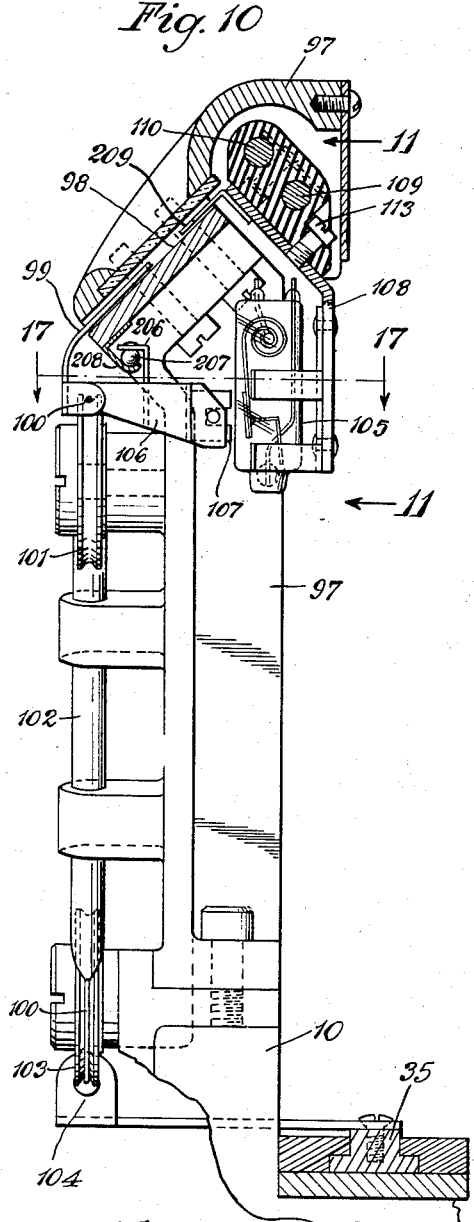
Figure 10 is a section on an enlarged scale along the line 10—10 of Figure 8.
Figure 15:
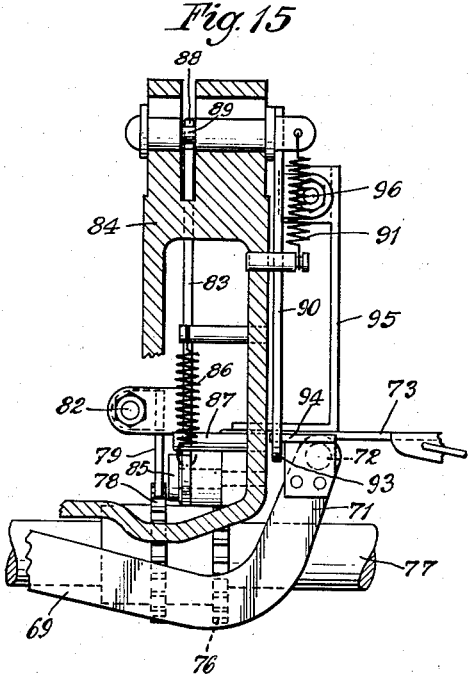
Figure 15 is a section along the line 15—15 of Figure 18.
Figure 16:
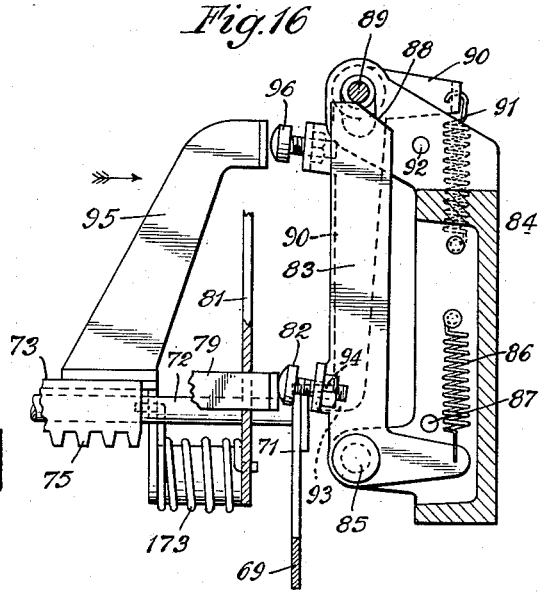
Figure 16 is a view similar to Figure 18 showing the parts in the position they occupy immediately before the end of the return stroke of the typewriter carriage.

Referring first to Figures 1 and 4, 1 indicates a typewriter. It includes the usual typewriter carriage and type bars not here illustrated as they form no part of my invention. 2 is a typewriter character key mounted on the lever 3. 4 is a typewriter shift key mounted on the lever 5. 6 is a space bar mounted on the lever 7. These levers 3, 5 and 7 are mounted on pivot supports, such as is illustrated diagrammatically at 8 in Figure 1, and are guided in their up and down movement by the typewriter comb plate 9.

10 is the selector unit frame. Mounted in the selector unit frame 10 is a guide comb 11. Slidable in the guide comb 11 are a plurality of key bar plungers 12, each key bar plunger being associated with one of the typewriter keys or levers 3. Pivoted on each key bar plunger 12 is an auxiliary key bar 13. The opposite end of each of the auxiliary key bars 13 is mounted in an auxiliary key bar guide comb 14 and terminates in a downward extension 15 to which is attached a spring 16, the other end of which is anchored on the bottom of the comb 14. Associated with each auxiliary key bar 13 is an auxiliary key bar pivot plate 17. Each such plate is connected to an adjusting screw 18, there being a series of adjusting screws 18 threaded in center adjustment sleeves 22 which are mounted between bars 19 and 19a and between bars 19a and 19b, which bars are fixedly mounted in the U-shaped supporting frame members 19c. Each of the auxiliary key bar pivot plates 17 is provided with a pivot member 20 slidable in a slot 21 in the auxiliary key bar 13 so that longitudinal movement of the adjusting screw 18 may move the pivot 20 toward and from the pivot end of the auxiliary key bar 13 where it is pivoted on the key bar extension 12. The frame members 19c are slidable on shaft 47 and may be slightly moved therealong, by means not here shown as they form no part of the present application, which engage the rollers 219 on brackets 220.

Each center adjustment sleeve 22 is flanged at each end, and has a flattened portion 23 engaged by a screw 24 threaded in the bar 19 so that the sleeve may move longitudinally but is held against rotation. Each adjusting screw 18 has a head 25 adapted to engage a T-shaped slot in the end of the pivot plate 17 and hold the end of that plate in a notch 26 in the inner flange of the center adjustment sleeve 22 so that the sleeve and the screw and the center plate 17 are held together as a unit for longitudinal movement.

The adjustment to compensate for different widths of letters is made by rotating the screw 18 so as to longitudinally displace the pivot plate 17 with respect to the sleeve 22, such adjustment being of such magnitude that the adjusting screw 18 always holds the end of the plate 17 in the notch in the flanged end of the sleeve 22.

Figure 3:
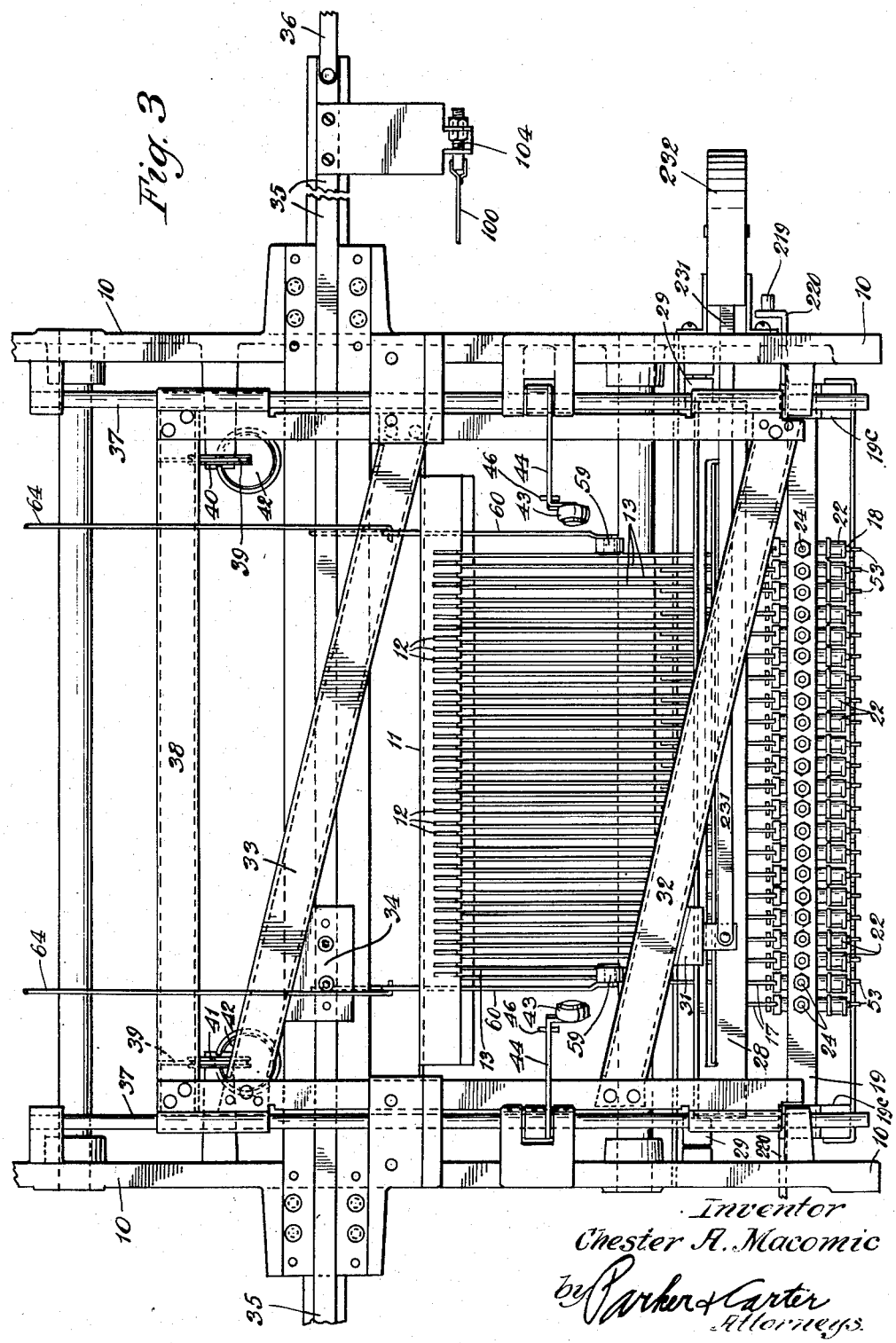
Figure 3 is a plan of the selector unit frame and associated parts.

In the arrangement above referred to, everything is set for lower case character selection, and when the operator depresses one of the typewriter keys the auxiliary key bar 13 is rotated in a clockwise direction about the pivot 20 and causes an upward movement of the cam member 27 on the auxiliary key bar 13. This brings the cam member 27 into engagement with the channel member 28 to rotate it around a center generally concentric with the center 20, the channel member 28 being supported on the bell crank lever 29, the lower end of which is held yieldingly downward by the spring 30. Upward movement of the channel 28 against the pressure of the spring 30 rotates the driving block 31 in a clockwise direction, as seen in Figures 3 and 4, toward the diagonal slide arm 32, as shown in Figure 3. This moves the slide forwardly toward the upper side of the drawing in Figure 3 because the block 31 engages the diagonal lower arm 32 of the slide. At the same time, the upper diagonal arm 33 of the slide moves in the same direction and to the same distance. The driving block 31 is moved toward the right in Figure 3 by the tension member 231 drawn by a spring in the housing 232 as the channel 28 draws back under the tension of the spring 30 when the typewriter key is released. This prepares for the next movement of the slide upon the next typewriter manipulation.

Engaging the arm 33 is the indicator locking plate 34. This is mounted on the indicator slide bar 35, which bar is slidably mounted in the frame 10 free to move in a direction at right angles to the direction of movement of the slide. The tension member 36 tends to move this bar toward the right, as shown in Figure 3, so that whenever the slide 33 moves upwardly the plate 34 is free to move to the right in consonance therewith, the distance it moves being dependent upon the movement of the slide at right angles to the line of movement of the plate 34.

It is of the utmost importance that the movement of the slide frame in the forward direction under control of the typewriter key be accurate and even, so the slide frame is rigidly mounted on the guide rails 37, is held against distortion by the cross members 38 and the diagonal rails 32 and 33, and the upward movement of the slide frame is resisted by counterbalance weights attached to cables 39 passing over pulleys 40 and 41 to support the weights 42, the point being that the resistance to movement offered to the frame by the weights is uniform and unvarying so that the response of the slide frame to the touch of the type-writer operator will always be uniform, except insofar as the adjustments have been made to cause different movement in response to selection of different characters.

Under each shift key is a roller 43 on a lever 44 pivoted on the frame 10. A lever 45, also pivoted on the frame 10, is joined to the lever 44 by a pivoted connection rod 46. The lever 45 is mounted on the shaft 47, the shaft 47 carrying in turn the lever 48, which lever carries a roller 49, the levers 45 and 48 being held against rotation with respect to the shaft 47, there being a similar arrangement on the other side of the machine. Thus when the operator depresses the shift key, the lever 44 is rotated and the lever 45 is rotated and the lever 48 is rotated to move the roller 49 downwardly in the slot 50 in the lever 51. The slot 50 is inclined, as indicated in Figure 4, so downward movement of the roller 49 rotates the lever 51 in a counter-clockwise direction, bringing the screws 52 upwardly against one arm of the bell crank levers 53. These screws are adjustable in a channel 54 extending clear across the front of the frame, and there is one screw 52 for each lever 53 so that when the operator depresses the shift key, all of the levers 53 are rotated in a counter-clockwise direction against tension of the springs 53', thus exerting a tension on the sleeves 22 to move them and each of the pivot plates 17 to the left so that no matter what character is selected, the auxiliary key bar for that character will have been set for the proper position to control the degree of movement of the slide frame in accordance with the selected character.

Each of the key bar plungers 12 is associated with an adjustable contact member 55, each contact member being slidable in the guide member 56 and provided with threaded adjustment means 57 so that when the member 12 strikes the member 55, it moves it downwardly to rotate the bell crank lever 58 in a counter-clockwise direction to actuate a part of a character selecting mechanism which is not illustrated in this application as its particular features form no part of the presently disclosed invention.

When the operator depresses the space bar 6, the space bar lever 7 engages a roller 59 on a lever 60, the lever being pivoted on the frame 10 at 61, there being such a lever on each side of the typewriter, the two levers being tied together by the connecting bar 62. 63 is a gooseneck on the lever 60 on which is anchored a tension member 64. The connecting tension member 64 is anchored to levers 65 on shaft 66 extending across the machine. This shaft 66 is pivoted in brackets 67 on the frame 10 and carries at each end levers 68 fixed to and rotating with the shaft 66. Pivoted on the shaft 66 are floating levers 69, which levers are supported on stirrups 70 on the levers 68. Each of the levers 69 terminates in a gooseneck 71, the goosenecks being joined by a tie-rod 72 extending clear across the machine, as best shown in Fig. 12.

73 is a lever pivoted at 74 on the typewriter carriage and supporting along its free edge a driving rack 75, which rack engages the gear 76 so that when the rack is in the down position shown in Figure 14, the shaft 77 is normally rotated by the driving rack 75 in consonance with the movement of the typewriter carriage. A gear 78 is also rigidly mounted on the shaft 77 and a floating rack 79 is in mesh and driven by the gear. The floating rack 79 floats in slots 80 in the typewriter carriage frame 81. As long as rack 75 is in mesh with the gear 76, any movement of the typewriter carriage causes this driving rack 75 to rotate the shaft 77 and that causes the gear 78 to longitudinally displace the floating rack 79 in consonance with typewriter carriage movement. If, however, the operator depresses the space bar rotating the lever 69 in a counter-clockwise direction, this will cause the gooseneck 71 and the tie bar 72 to rotate the lever 73 in a clockwise direction against the tension of the spring 173 to disengage the driving rack 75 and the gear 76 so that movement of the typewriter carriage may continue without rotating shaft 77.

As the typewriter operator writes a line on the typewriter, the shaft 77 rotates step by step to move the selector carriage toward the right as the typewriter carriage moves toward the left as each character key is struck and the shaft 77 thus is driven step by step. The purpose of this shaft is to drive a selector carriage mechanism which is part of my composing system but is not shown and illustrated here because its details form no part of the invention here disclosed.

When the operator comes to the end of a word, she strikes the space bar that disconnects the typewriter carriage from the shaft 77 so that the next movement of the typewriter carriage takes place without any movement of the shaft 77. The result of this is that the movement of the shaft 77 and the elements actuated thereby is different in degree from the movement of the typewriter carriage, and at the end of the line when the typewriter carriage returns to its starting position it is essential that the elements driven by the shaft 77 also return to their starting position.

On the reverse movement of the typewriter carriage, the shaft 77 rotates in the opposite direction and drives the floating rack 79. Because the floating rack 79 has dropped behind the driving rack 75 as the typewriter carriage went from starting to end position, the floating rack will precede the driving rack on the return travel, and means must be provided to disengage the driving rack from its driving relationship with the shaft 77 so that the typewriter carriage can return to the starting position even though the shaft 77 and the parts driven by it have already reached the starting position. This is accomplished by providing in the path of the floating rack 79 an abutment 82. This abutment is carried by the lever 83, which lever is pivoted on a bracket 84 carried by the frame 10. This lever is pivoted at 85 and the spring 86 tends to rotate it against the stop 87 in a counter-clockwise direction. As the carriage returns and the floating rack 79 engages the abutment 82, the lever 83 is rotated in a clockwise direction causing the cam surface 88 to engage the roller 89 and cam that roller upwardly. The upward movement of the roller 89 on which the latch lever 90 is pivoted permits the spring 91 to rotate the latch lever 90 in a clockwise direction against the stop 92. This swings the lower hook end 93 of the latch lever 90 to the left in Figure 18, and brings it under the step or latch member 94 on the gooseneck 71. Further upward movement of the roller 89 raises the latch lever 90 up to lift the gooseneck 71 and cause it to rotate the lever 73 and the driving rack 75 in a clockwise direction out of engagement with the gear 76 so that the typewriter carriage may continue its returning movement, leaving the shaft 77 idle. When the typewriter carriage with its driving rack returns to the starting position, the arm 95 on the lever 73 engages an abutment 96 on the latch lever 90 to rotate it in counter-clockwise direction to cause the hook 93 to disengage the latch member 94 to permit the lever 69 to rotate in a clockwise direction and allow the driving rack 75 to re-engage the gear 76. The engagement of the arm 95 with the abutment 96 on the latch lever 90 overcomes the tension of the spring 91, and rotates the spring end of the latch lever 90 away from the abutment 92. As soon as the carriage starts again on its forward movement, the pressure on the abutment 82 on the lever 83 is released, the spring 86 rotates the lever 83 in a counter-clockwise direction, and this allows the latch 90 to drop down into the position at which at the end of the return stroke it can repeat its locking out action.

As soon as the typewriter carriage reaches zero, the driving rack 75 is permitted to re-engage the teeth on the gear 76 and the disengaging means remains idle until the typewriter carriage has cleared a space of 0.050" when the spring take-up returns the abutment piece to its normal position.

Figure 17:
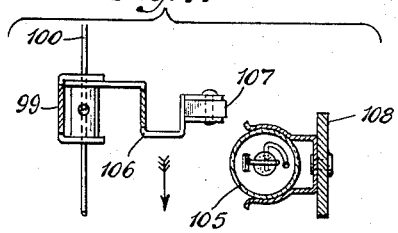
Figure 17 is a section along the line 17—17 of Figure 10.

Projecting upwardly from the frame 10 as best shown in Figure 8 is a frame element 97 which extends across, immediately above and generally in front of, the typewriter frame but behind the typewriter keyboard. Carried on this frame is a scale 98. An indicator 99 is mounted to travel along the frame in front of the scale 98. A cable 100 extends in both directions from said indicator 99 around sheaves 101, downwardly through guides 102, over sheaves 103 at each end of the frame to adjustable anchorages 104 on the bar 35 so that as this bar moves, the operator sees the position occupied by the character selected. The purpose of this is, of course, to guide the operator in making composition so that the operator will not by accident try to put into the line of composition more characters than the space allotted for the line measure. Slidably mounted on the indicator frame 97 is a microswitch assembly 105. This may be set and locked by hand according to the line measure to be composed. Driven by the cable 100 is a bracket 106 carrying a permanent magnet 107, so positioned with respect to the position of the micro-switch 105 that when the permanent magnet moves forwardly toward and comes into register with the switch, the magnet will actuate the switch. The bracket 106 is supported by a yoke 206 with bearing ball 207 traveling along the troughed track 208. The operator must be protected against the danger of making a mistake which would result in the apparatus trying to assemble more characters in a given line measure than can be accommodated. The visual pointer aids the operator to avoid making this mistake. However, means must be provided to positively prevent such mistake, or at least if the mistake is made, to positively prevent the mistake being translated into a machine failure, so electrical means are provided to stop the operation of the apparatus if such mistake is made. This means takes the form of the microswitch 105 adjustably mounted immediately behind the path of the indicator 99 so that the operator may position that switch for the desired line measure. When the indicator and the fixed magnet have traveled up to the maximum permissible limit of excursion, any further movement of the indicator 99 brings the fixed magnet 107 into such relationship with the micro-switch 105 that the circuit is broken and machine operation is prevented. Figure 17 shows the magnet just about to reach the position at which such breaking of the circuit takes place. The particular details of the electric circuit, relays, etc., are not shown since those details form no part of the present invention. The micro-switch 105 is mounted in a bracket 108 which is slidable on the two contact rods 109 and 110, the rods being supported in a mounting block 111 held by the screw 112 on the frame 97. The screws 113 hold the bracket 108 on the rods 109 and 110 and spring contact members 114 and 115 close the circuit between the conductor and supporting rods 109, 110 and the micro-switch 105. The micro-switch is thus movable along the line parallel with the line of movement of the indicator 99 and remains in the position in which the operator places it, such position being visually indicated by the indicator finger 209.

Although I have shown an operative form of my invention, it will be recognized that many changes in the form, shape and arrangement of parts can be made without departing from the spirit of the invention, and my showing is therefore to be taken as, in a sense, diagrammatic.

I claim:

1. In combination in a composing machine, a typewriter having typewriter keys and a carriage, means for imparting to the typewriter carriage a uniform movement each time a typewriter key is struck, a sliding frame and means for moving it a predetermined distance whenever a typewriter key is struck, automatic means for preventing retrograde movement of the sliding frame, and means for adjusting the excursion of the frame in response to the striking of each typewriter key whereby the excursion of the frame may vary with respect to the excursion of the typewriter carriage, said means including a separate adjustable mechanical connection directly interposed between each typewriter key and the sliding frame.

2. In combination, a sliding frame having a pair of members inclined to the direction of movement of the frame, movable means adapted to engage one of said members to move the frame, a sliding member movable at right angles to the movement of the frame, stop means carried thereby engaging the other of said members, and means to move the sliding member each time the sliding frame is moved.

3. In combination, a sliding frame and a sliding bar movable along paths at right angles to one another, a member on the sliding frame inclined to its line of movement, yielding means for resisting movement of the frame and yielding means for causing movement of the bar, and a member on the bar engaging the inclined member on the frame to prevent movement of the bar except when the frame is moved.

4. In combination, a sliding frame and a sliding bar movable along paths at right angles to one another, a member on the sliding frame inclined to its line of movement, yielding means for resisting movement of the frame and yielding means for causing movement of the bar, a member on the bar engaging the inclined member on the frame to prevent movement of the bar except when the frame is moved, and means adapted to engage the frame and to remain in working relationship therewith, independent of its position for imparting a step-by-step movement to the frame.

5. In combination, a sliding frame and a sliding bar movable along paths at right angles to one another, a member on the sliding frame inclined to its line of movement, yielding means for resisting movement of the frame and yielding means for causing movement of the bar, a member on the bar engaging the inclined member on the frame to prevent movement of the bar except when the frame is moved, means adapted to engage the frame and to remain in working relationship therewith, independent of its position for imparting a step-by-step movement to the frame, a typewriter having key bars, and means connecting said key bars and the frame moving means whereby each time a key bar is struck, the frame is moved.

6. In combination, a sliding frame and a sliding bar movable along paths at right angles to one another, a member on the sliding frame inclined to its line of movement, yielding means for resisting movement of the frame and yielding means for causing movement of the bar, a member on the bar engaging the inclined member on the frame to prevent movement of the bar except when the frame is moved, means adapted to engage the frame and to remain in working relationship therewith, independent of its position for imparting a step-by-step movement to the frame, a typewriter having key bars, and means connecting said key bars and the frame moving means whereby each time a key bar is struck, the frame is moved, the connecting means between each typewriter key bar and the frame moving means being adjustable whereby the excursion of the frame in response to the actuation of any selected key may be adjusted.

7. In a composing machine, in combination with a typewriter having a plurality of key bars, a key bar plunger associated with each typewriter key bar, a lever rotatably connected to the key bar plunger, and means for adjusting the effective length of said lever separately for each key bar.

8. In a composing machine, in combination with a typewriter having a plurality of key bars, a key bar plunger associated with each typewriter key bar, a lever pivotally connected to the key bar plunger, and means for adjusting the effective length of said lever separately for each key bar, said means including a pivot plate, a sliding pivot connection between it and the lever, and means for moving the plate toward and from the pivotal connection between the lever and the key bar plunger.

9. In a composing machine, a typewriter having key bars, a sliding frame associated with the typewriter, levers, key bar plungers on which the levers are pivoted adapted to be actuated by the typewriter key bars, a rotating member adapted to be rotated selectively by any one of the levers actuated by the typewriter key bars, and means for adjusting the excursion of the rotating member in response to the actuation of any of the typewriter key bars.

10. In a composing machine including a typewriter having typewriter keys and a movable typewriter carriage, a sliding frame member having surfaces inclined to its line of movement, a control member movable in a direction at right angles to the line of movement of the sliding frame member and having a lock member engaging one of the inclined surfaces whereby movement of the control member is limited by the engagement of the lock member with the inclined surface, separate means adapted to be actuated in response to the actuation of a typewriter key for moving the sliding frame member forwardly, means for adjusting the extent of movement in response to each typewriter key actuation, and a connection between each such adjusted typewriter connection and another of the inclined surfaces of the sliding frame whereby movement step by step of the sliding frame in response to each typewriter key actuation is independent of the position of the frame.

11. In a composing machine including a typewriter having a typewriter carriage, a driving rack and a floating rack, means for moving the driving rack in consonance with the movement of the typewriter carriage, a driving connection between the driving rack and the floating rack, the typewriter having a space bar, and a connection between the space bar and the driving rack whereby actuation of the space bar disengages the driving rack from the driving connection to permit movement of the driving rack and typewriter carriage while the floating rack remains at rest.

12. In a composing machine including a typewriter having a typewriter carriage, a driving rack and a floating rack, means for moving the driving rack in consonance with the movement of the typewriter carriage, a driving connection between the driving rack and the floating rack, the typewriter having a space bar, a connection between the space bar and the driving rack whereby actuation of the space bar disengages the driving rack from the driving connection to permit movement of the driving rack and typewriter carriage while the floating rack remains at rest, means for returning the typewriter carriage to its starting position, and means associated therewith for returning the floating rack through a different excursion to its starting position.

13. In combination, a shaft, a pair of gears keyed thereon, a rack in mesh with one of the gears, a lever mounted for rotation about an axis perpendicular to the axis of the shaft, a rack carried thereby adapted selectively to be in mesh with the other gear, a member movable with the first mentioned rack, and means including an abutment in the path of said member adapted when the member reaches the limit of its excursion to be engaged thereby to cause rotation of the lever to disengage the rack carried thereby from said other gear.

14. In combination, a longitudinally movable carriage, a driving rack mounted thereon, a drive shaft having a gear thereon in mesh with the driving rack, a floating rack mounted for movement parallel with the driving rack, a gear on the shaft adapted to be in mesh with the floating rack, a lever on which the driving rack is mounted, a latch lever having a hook adapted to extend beneath the lever on which the driving rack is mounted and means adapted to be engaged by the floating rack at the end of its excursion to raise such latch hook to rotate the lever and disengage the driving rack from its gear.

15. In a composing machine, a typewriter having a movable spacing carriage, a space bar, character key bars and a shift key, a selector member and means controlled by the character key bars and the shift key for moving said member, means for controlling the travel of the selector member in consonance with the travel of the typewriter carriage but at different lengths of step by step travel as characters are selected, means for restraining the selector member from travel when the typewriter carriage is spaced without character selection, and means for indicating the length of line established in terms of travel of the selecting means.

16. In a composing machine including a typewriter, a character selector means controlled by the typewriter, an indicator movable in consonance with the selector means adapted to indicate the length of line being composed, and means for positively arresting the operation of the machine when the operator endeavors to form a line longer than the machine can accommodate, said means including a micro-switch and a magnet, and means for relatively adjusting them so that when the indicator reaches the point selected by said adjustment the apparatus is rendered inoperative.

17. In a composing machine, a typewriter having a movable carriage, key bars and a shift key, a selector member and means controlled by the key bars and shift key for moving it, means for adjusting the travel of the selector member in coordination step by step with but at a different length of travel from the typewriter carriage, said means including a separate adjustable mechanism connection directly interposed between each key bar and the selector member, and means independent of and responsive to the movement of the selector member for indicating the length of line selected in terms of travel of the selector member.

18. In a composing machine, a typewriter having a movable carriage, key bars and a shift key, a selector member and means controlled by the key bars and shift key for moving it, means for adjusting the travel of the selector member in coordination step by step with but at a different length of travel from the typewriter carriage, means for indicating the length of line selected in terms of travel of the selector member, and means adapted to be set by the operator for positively preventing the operation of the composing machine when the overall length of travel of the selector member equals the predetermined length of the line.

References Cited in the file of this patent

UNITED STATES PATENTS

| | | |
|---|---|---|
| 1,145,359 | Drewell | July 6, 1915 |
| 1,907,234 | Belash | May 2, 1933 |
| 2,067,183 | Green | Jan. 12, 1937 |
| 2,114,294 | Green | Apr. 19, 1938 |
| 2,178,379 | Spievak | Oct. 31, 1939 |
| 2,390,413 | Ayres | Dec. 4, 1945 |